INVENTORS
HARRISON W. FULLER
ROBERT J. SPAIN

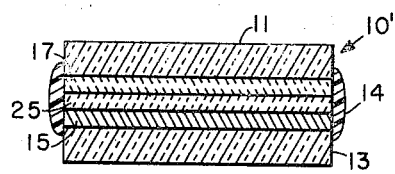
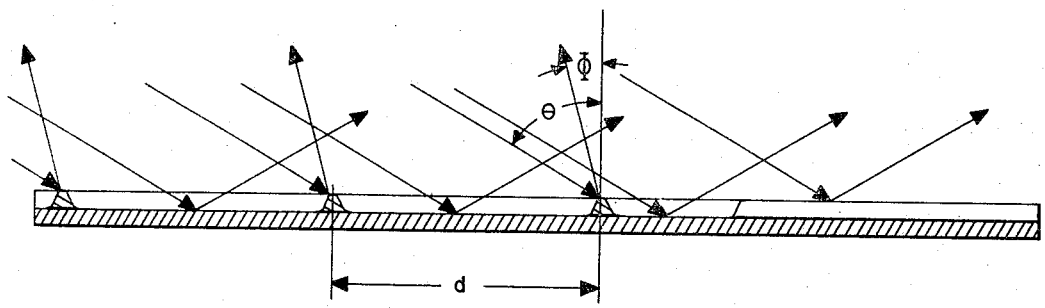
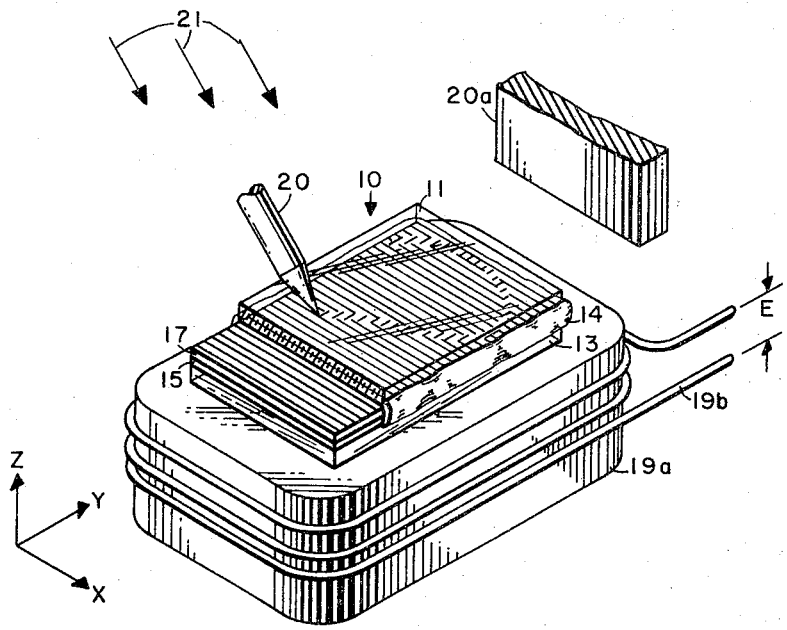
FIG. 3
FIG. 2
FIG. 1
INVENTORS
HARRISON W. FULLER
ROBERT J. SPAIN Oct. 17, 1967  H. W. FULLER ETAL  3,347,614
MAGNETIC FILM DISPLAY DEVICE
Filed March 13, 1964  5 Sheets-Sheet 2

INVENTORS
HARRISON W. FULLER
ROBERT J. SPAIN

INVENTORS
HARRISON W. FULLER
ROBERT J. SPAIN

INVENTORS
HARRISON W. FULLER
ROBERT J. SPAIN

United States Patent Office 3,347,614
Patented Oct. 17, 1967

3,347,614
MAGNETIC FILM DISPLAY DEVICE
Harrison W. Fuller, Needham Heights, and Robert J. Spain, Brookline, Mass., assignors to Laboratory for Electronics, Inc., Boston, Mass., a corporation of Delaware
Filed Mar. 13, 1964, Ser. No. 351,693
7 Claims. (Cl. 350—162)

ABSTRACT OF THE DISCLOSURE

This invention relates to an apparatus for forming a desired image by diffraction of light from a suspension of ferromagnetic particles in a liquid overlying a ferromagnetic film. The ferromagnetic film has a domain structure with the width of each domain being in the order of the wavelength of the light. The direction of magnetization of selected domains can be altered to provide a visible image with diffracted light.

---

This invention pertains generally to image forming apparatus and particularly to apparatus which is adapted to forming a bright display on a large viewing screen.

The need for improved apparatus for forming an image on a large viewing screen has been recognized in the art for many years. The need has been especially acute when changeable pictorial, textual or graphic information must be presented in such a manner that each individual in a group may easily see such displayed information.

Among the types of known bright displays, the so-called "projection" display and the so-called "multi-element panel" display have attained a rather widespread acceptance in the art. In addition, much developmental work has been carried on to devise a satisfactory display using the phenomenon of electro-luminescence. Further, some attempts have been made to make a satisfactory display utilizing the Kerr or Faraday effect of a magnetic field on polarized light.

Projection type displays, employing photographic film or a cathode ray tube have been used for many years. It is known, however, that such displays occupy a relatively large space and suffer from other failings. For example, if photographic film or slides are used, the time to "update" or change a displayed image is relatively long and the logistic problem of supplying enough film or slides is acute. On the other hand, if a cathode ray tube is used, the size of the image finally displayed is limited because the brightness of practical cathode ray tubes is relatively low. Further, it is extremely difficult to provide a long-lasting image using a cathode ray tube.

The known "multielement panel" displays (wherein a plurality of similar, but individually actuated, electromechanical or luminescent elements form an image) are well adapted to use in applications where space for the display itself is limited. The operating hardware for each element may be small and the necessary control equipment may be disposed wherever convenience dictates. It has been recognized, however, that known multielement panel type displays are not particularly well adapted to use wherever the resolution of the displayed image is important, since a maximum resolution of about eight elements per square inch is the limit in known displays of this type.

The electroluminescent and the magnetic displays are as of the present moment, adapted only to laboratory and other special applications, because both types are even less bright than a cathode ray tube projection display. The electroluminescent display further is nonpermanent and of rather low resolution due to interaction, or "cross-talk" between adjacent elemental areas.

Therefore it is an object of this invention to provide an improved display which has a high light output and contrast ratio.

Another object of this invention is to provide an improved panel type display which is fabricated from a plurality of small rugged elements so that, even though the completed display is compact, it still is capable of withstanding high stresses.

Still another object of this invention is to provide an improved display which has high resolution.

Still another object of this invention is to provide an improved display on which, for all practical purposes, an image may be permanently shown.

Still another object of this invention is to provide an improved display which is adapted to relatively quick changes in any image displayed thereon.

Still another object of this invention is to provide an improved display which meets the foregoing objects and is relatively inexpensive, requires little power to operate, is easy to maintain, and provides colored images.

These and other objects of this invention are attained generally by assembling a plurality of identical elements to form a panel of the desired size. Each element, in the presently preferred embodiments of this invention, consists of a planar, hermetically-sealed unit containing a magnetic film fabricated so as to exhibit type 1 rotatable initial susceptibility (which film is hereinafter sometimes called "RIS–1" film) and an overlying colloidal suspension of fine particles of iron oxide. The RIS–1 film in each element initially has a stable micro-domain structure consisting of narrow, parallel domains running in a predetermined direction in the RIS–1 film. The particles of iron oxide align themselves with the fields between the domains (that is, over the interdomain walls), thus forming lines of particles of iron oxide which act as a reflecting diffraction grating to light incident thereon. Portions of the micro-domain structure then are modified, by application of an appropriate magnetic field, so that the lines of particles of iron oxide are rearranged over such portions to form a "magnetic" image. Thus, when the element is illuminated, the particular arrangement of the lines of particles of iron oxide then existing causes such light to be diffracted to form an optical image corresponding to the "magnetic" image. Such diffracted light may be observed directly or projected on a viewing screen, thereby producing a visible image of the state of the micro-domain structure of the RIS–1 film. For a more complete understanding of this invention, reference is now made to the following detailed description of various embodiments of this invention and to the drawings, in which:

FIG. 1 is a view, greatly distorted and partially broken away, of an element of a display according to one embodiment of this invention;

FIG. 2 is a sketch showing the manner in which light incident on any element is diffracted;

FIG. 3 is a cross-sectional view, greatly distorted and simplified, of an element of a display according to a second embodiment of this invention;

Figure 4:
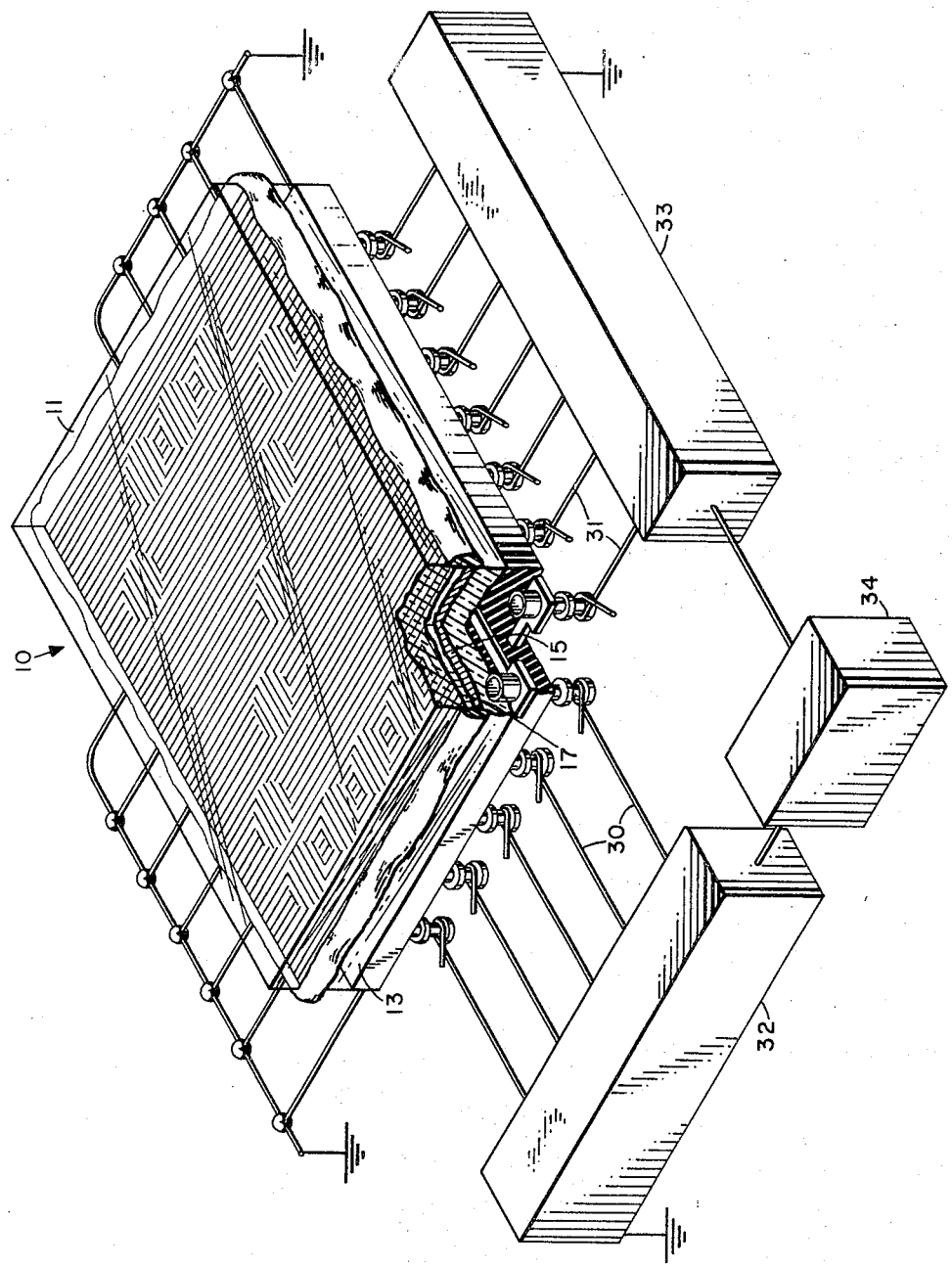
FIG. 4 is a view, again greatly distorted and partially broken away, of element of a display according to still another embodiment of this invention.

Before referring to the figures it should be understood that the term "magnetic film" as used herein primarily means an anomalous ferromagnetic film wherein the rotatable initial susceptibility, as measured by a low drive field, is zero in the direction of the last saturating field (which may be either a DC or an AC field) applied to such film and is a maximum 90° away from such direction. Such a film is also characterized by a micro-domain structure, wherein the direction of magnetization varies up and down out of the plane of the film and transverse to the direction of the last applied saturating field. In the art, such a film is termed a "type 1, rotatable initial susceptibility film" (RIS–1). It is not intended, however, that it be thought that only an RIS–1 film is adapted to use in our invention. Rather, as will become clear hereinafter, it should be realized that any ferromagnetic material which exhibits a micro-domain structure similar to the micro-domain structure of an RIS–1 film may be used.

Referring now to FIG. 1, an element 10 according to one embodiment of this invention may be seen to comprise an upper and a lower cover plate 11, 13 bonded together by a sealant 14, as wax, around a magnetic film 15 and a suspension 17 of a ferromagnetic material, as particles of iron oxide, in a liquid, as water. The upper and the lower cover plates 11, 13 preferably are fabricated from a non-magnetic transparent material, as glass. The magnetic film 15 is an RIS–1 type film, fabricated by depositing a ferromagnetic material, as any of the class of materials known as "permalloy" (for example, Fe 85%, Ni 15%) to a thickness, say, of about 900 angstroms, on the lower cover plate 13. That is, the magnetic film 15 may be deposited on the lower cover plate 13 in the manner described by Cohen in the Journal of Applied Physics, volume 33, number 10, page 2969, October 1962. After the magnetic film 15 is subjected to a strong magnetic field (say 70 oersteds peak field drive preferably from an AC source, not shown, in the X direction) a stable, dense-banded micro-domain structure is set up in such film as indicated by the broken lines (unnumbered) running parallel with the X-axis in FIG. 1. The width of the individual domains in such a structure is in the order of 9000 angstroms and the domain boundaries are, within observable limits, parallel to the direction of the magnetizing field.

The suspension 17 preferably comprises particles of iron oxide in water taught by Bitter in the Physics Review 54, 309 (1938), although it is not essential to this invention that such particles be suspended in a liquid. A drop of the suspension 17 is placed on the magnetic film 15 and the upper cover plate 11 is then placed in position as shown, thereby producing a thin layer of the suspension 17 between the magnetic film 15 and the upper cover plate 11. The particles of iron oxide in the suspension 17 (which are initially evenly distributed in the suspension 17) are free to align themselves in accordance with the external magnetic field of the magnetic film 15. In the present case, since the AC magnetizing field creates domains adjacent to one another, a magnetic field having lines of force external of the magnetic film 15 links adjacent domains. The density of such lines is greater near the domain walls between adjacent domains than at other points. It follows, then, that the particles of iron oxide, in the aggregate, cluster in the more intense portions of the magnetic field between adjacent domains and, in the process, form long continuous lines of particles of iron oxide corresponding to the position of the domain walls in the magnetic film 15. It should be noted here that, as shown in FIG. 1, the tendency of the particles of iron oxide in the suspension 17 to cluster over the domain walls in the magnetic film 15 may be supplemented by applying a magnetic field perpendicular to the plane of the magnetic film 15. That is, an electromagnet, consisting of a core 19a and a coil 19b across which a DC voltage E is applied from a source (not shown) may be utilized to intensify the effect of the magnetic field parallel to the Z axis in FIG. 1.

It has been found that the direction of the domains in the magnetic film 15 may be changed as desired by a magnetic field whose direction differs from that of the AC magnetizing field which originally created the domains. As shown in FIG. 1, one way to accomplish such a change is to move a stylus 20 fabricated from a ferromagnetic material over the upper surface of the upper cover plate 11. The external magnetic field of the stylus 20 thus changes the direction of some of the domains in the magnetic field 15. It should be noted here that the degree of rotation of the affected portions of the domains in the magnetic film 15 is not critical, so long as the final direction of such portions differs by an appreciable amount, say more than 20°, from their original direction of magnetization. When the stylus 20 is removed, it will be found that, while the direction of magnetization of the portions of the domains affected by the magnetic field of the stylus 20 has been changed, the micro-domain structure thereof is the same as in the rest of the magnetic film 15. Consequently, the particles of iron oxide in the suspension 17 adjacent to the switched portions of the domains in the magnetic film 15 rotate to set up lines of particles following the direction of the switched portions of the domain walls.

The fact that each line of particles of iron oxide is clustered over a domain wall in the magnetic film 15 changes the reflectivity of each unit area thereof to electromagnetic energy. Each line of particles of iron oxide acts as a semicircular lens with a reflecting surface while the part of the suspension 17 between the lines of particles is almost transparent. Thus, it may be seen that when electromagnetic energy, as collimated light 21 (represented here by the slanted arrows of FIG. 1) is emitted from a source (not shown) and is directed on to the upper cover plate 11, such light finally impinges on the suspension 17. Substantially all of the collimated light 21 which impinges on the suspension 17 between the lines of particles of iron oxide is specularly reflected from the magnetic film 15. The portion of the collimated light 21 which falls on the lines of particles of iron oxide in the suspension 17 is also reflected, but in a different direction from the portion of the collimated light 21 reflected from the magnetic film 15. Further, since the lines of particles of iron oxide are parallel to, and separated from each other by approximately 9000 angstroms (which distance is within the range of wavelengths of visible light) the lines of particles of iron oxide in the suspension 17 act as a reflection diffraction grating. That is, constructive and destructive interference effects modify the light reflected from the lines of particles of iron oxide.

If it be assumed that the incident light consists of plane waves, so that the Huygen wavelets in such waves have the same phase across any plane normal to the direction of the incident light, then the diffraction effect of the lines of particles of iron oxide may be predicted. Thus, referring now to FIG. 2, it may be seen that for monochromatic and collimated light of wavelength, $\lambda$, impinging on the lines of particles of iron oxide at an angle of incidence, $\theta$, constructive interference between light reflected from such lines occurs when the optical path difference of the light to two adacent lines of particles of iron oxide is an integral number, $n$, of wavelengths of the incident light. Such a difference occurs at an angle, $\phi$, measured from a normal to the magnetic film 15 in a plane perpendicular to the lines of particles of iron oxide which satisfies the following equation:

$$\phi = \arcsin [n\lambda/d - \sin \theta]$$

where $d$ equals the distance between adjacent lines of particles of iron oxide.

It should be noted here that if white light, rather than monochromatic light, is used to illuminate the lines of particles of iron oxide and if $\theta$, $n$ and $d$ are fixed, then $\phi$ becomes a monotonic function of $\lambda$. In other words, a diffraction spectrum is produced, making the observed color dependent upon the position of the observer. Further, it will be noted, that, at any observation point, the light seen to be reflected from the lines of particles of iron oxide will depend on the orientation of such lines.

A permanent magnet 20a having a relatively wide pole tip is also disposed so as to be movable over the upper surface of the upper cover plate 11. Obviously, when such an element is moved across the upper cover plate 11, the external magnetic field therefrom reorients all the domains in the magnetic film 15, thus causing the lines of particles of iron oxide in the suspension 17 to be realigned. In other words, movement of the permanent magnet 20a results in erasure of any image on the magnetic film 15.

Referring now to FIG. 3, an element 10′ is shown which is similar to the element 10 of FIG. 1 except that a quarter-wave plate 25 is disposed between the magnetic film 15 and the suspension 17. Such a plate is well known in the field of optics. Its obvious purpose is to provide means for destructively interferring with the collimated light 21 which is specularly reflected from the magnetic film 15.

Referring now to FIG. 4, an arrangement for forming images on an element 10 by the so-called "dot" system is illustrated. In FIG. 4, an orthogonal matrix of wires, consisting of X current conductors 30 and Y current conductors 31 is disposed in any known manner, as by printed circuit techniques, on the lower surface of the lower cover plate 13. The X current conductors 30 and the Y current conductors 31 are each grounded on one side and connected through conventional circuitry, as shown, to a column driver 32 and a row driver 33. The latter two elements in turn are controlled by a programmer 34. The last three named elements may be of the type described in U.S. Patent No. 2,920,312 or of the type shown in FIG. 5 hereinafter.

The arrangement shown in FIG. 4 (and the arrangement of FIG. 5) are operated in the so-called "coincident current" mode to form an image. That is, the drive currents to the various X and Y current conductors 30, 31 are so adjusted that, while the magnetic field from a DC pulse of approximately 5 microseconds in a single conductor is insufficient to switch the direction of magnetization of any portion of the magnetic film 15, drive currents applied simultaneously to an X and a Y current conductor produce a magnetic field adjacent the cross-over point of such energized conductors sufficiently strong to switch the direction of magnetization of the adjacent portion of the magnetic film 15. It should be noted here that, if pulses of equal amplitude are applied to an X and a Y current conductor, the final direction of magnetization of the switched portion of the magnetic film 15 will bisect the angle between the energized conductors. In practice, however, it is preferred to apply pulses of unequal amplitude to the X and Y current conductors so that the resulting direction of magnetization of the switched portion of the magnetic film 15 does not bisect the angle between the energized conductors. In any event, however, the direction of magnetization of the switched and unswitched portions of the magnetic film 15 are 90° from each other after application of coincident pulses to any X and Y current conductors. It follows, then, that any desired image may be generated by selectively energizing appropriate ones of the X and Y current conductors 30, 31 to set up a pattern of dots of switched portions in the magnetic film 15. The lines of iron oxide in the suspension 17 overlying such switched portions rotate and visible dots (which may be integrated in the eye of an observer to form the desired image) result. It follows, also, that erasure of any image may be easily accomplished by applying coincident currents to the X and Y conductors which were energized to form the image so as to switch the direction of magnetization of the switched portions of the magnetic film 15 back to the original direction. A moment's thought will make it clear that, to accomplish the desired reorientation, the polarity of the current applied to one of the conductors should be reversed and the amplitude of the pulses should be interchanged.

Figure 5:
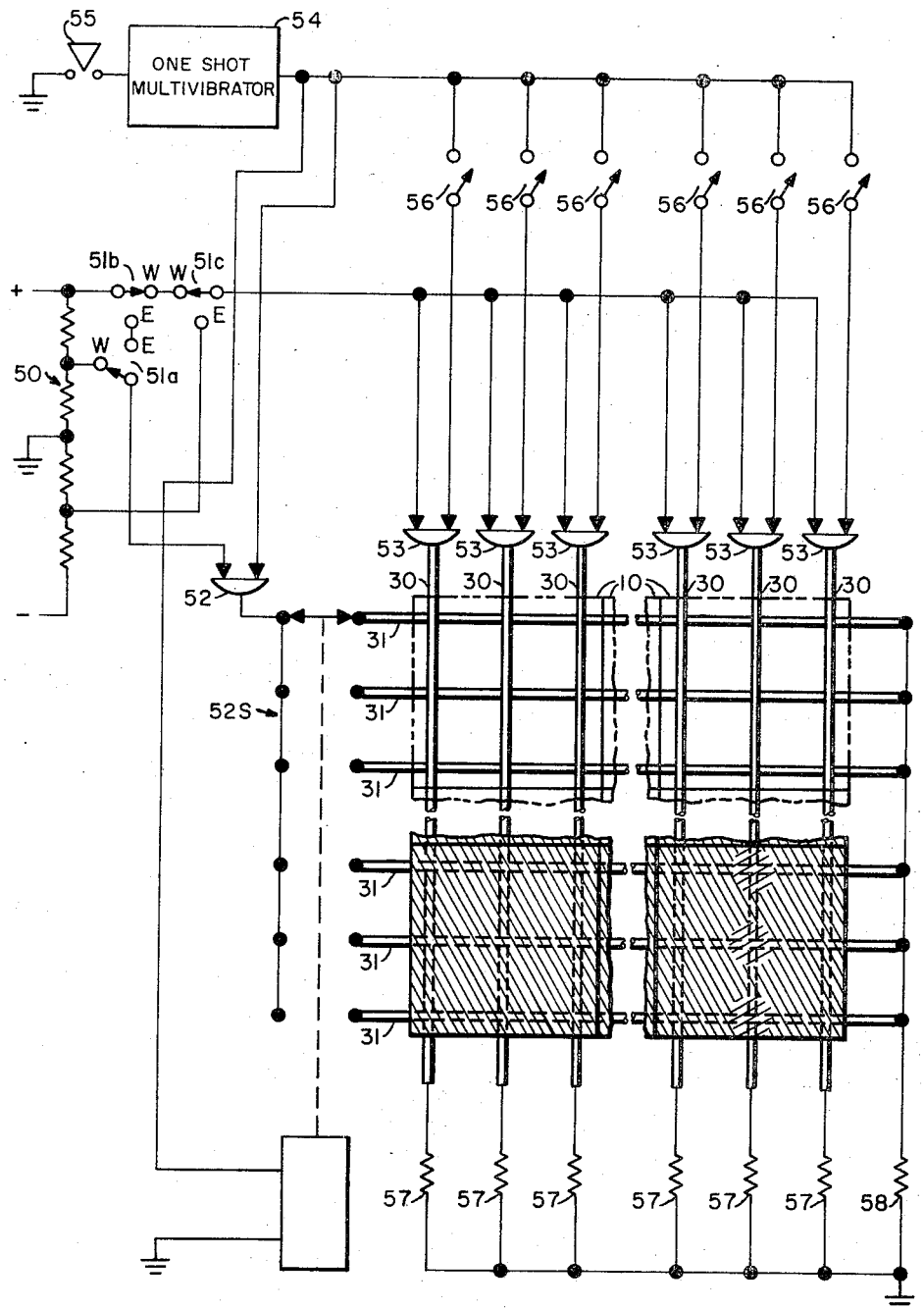
FIGS. 5, 6 and 7 are diagrams illustrating various ways in which elements of the type shown in either FIG. 1, 3 or 4 may be assembled and magnetized so as to form a multielement panel type display.

Referring now particularly to FIG. 5, it may be seen that a multielement panel according to this invention may comprise a plurality of elements 10 abutting each other and means for selectively switching the direction of magnetization of selected portions of each of the elements 10 to provide the desired image. It should be noted here that, for convenience, only a few of the elements 10 have been shown and necessary lighting and support means for the elements have not been shown. Further, it should be noted that, since there are a number of elements 10 in the multi-element display of FIG. 5, the X and Y current conductors 30, 31 would more easily be supported on the support means than on the lower cover plate of each element 10.

The means for selectively switching the direction of magnetization of selected portions of each of the elements 10 will now be described. Such means includes a bipolar DC power supply 50 (here shown as including an appropriately connected resistor) to which a plurality of switches 51a, 51b, 51c, are connected. The just mentioned switches each have a position marked W (meaning write) and a position marked E (meaning erase). Switch 51a is connected to an and gate 52 and switch 51c is connected to a plurality of and gates 53 as shown. The and gate 52 is connected to a stepping switch 52S so that the output of the and gate 52 is applied sequentially to the Y current conductors 31 while each of the and gates 53 is connected to a separate one of the X current conductors 30. The and gates 52, 53 are enabled by an output signal from a one shot multivibrator 54 (which is controlled by a switch 55), the and gates 53 each being connected through an on-off switch 56 as shown. The control circuitry is completed by grounding the X and Y current conductors 30, 31 through resistors 57, 58.

It may be seen from the foregoing that when the switches 51a, 51b, 51c are in the W position that a relatively high positive voltage is applied to the and gates 53 and a lower positive voltage is applied to the and gate 52. The switches 56, however, are all open. Therefore when the switch 55 is closed the output pulse from the multivibrator 54 (which has a duration of say 5 microseconds) enables only and gate 52. The current passing through the and gate 52 and the engaged contacts of stepping switch 52S does not create a large enough magnetic field around the first Y current conductor to switch the overlying portions of the magnetic film in the element 10. Consequently, after the output pulse from the one shot multivibrator 54 passes, the and gate 52 is disabled and the magnetic film in the element 10 remains in its original state. If, however, any or all of the switches 56 were to be closed and the switch 55 were to be actuated, a different situation would obtain, since the and gate 53 in circuit with any closed one of the switches 56 would be enabled. A pulse of current then would pass through the ones of the X current conductors 30 which were enabled. The resultant magnetic field adjacent to the cross-over points of the energized one of the Y current conductors 31 and the energized one or ones of the X current conductors 30 is sufficiently strong to switch the direction of magnetization of the magnetic film in the elements 10.

When it is desired to erase an image, switches 51a, 51b, 51c are placed in their E position and the switches 56 are arranged in position for writing. Thus, the resultant field adjacent each cross-over point of the energized X and Y current conductors 30, 31 is such that the portions of the magnetic film in each element 10 are returned to their original direction of magnetization.

Figure 6:
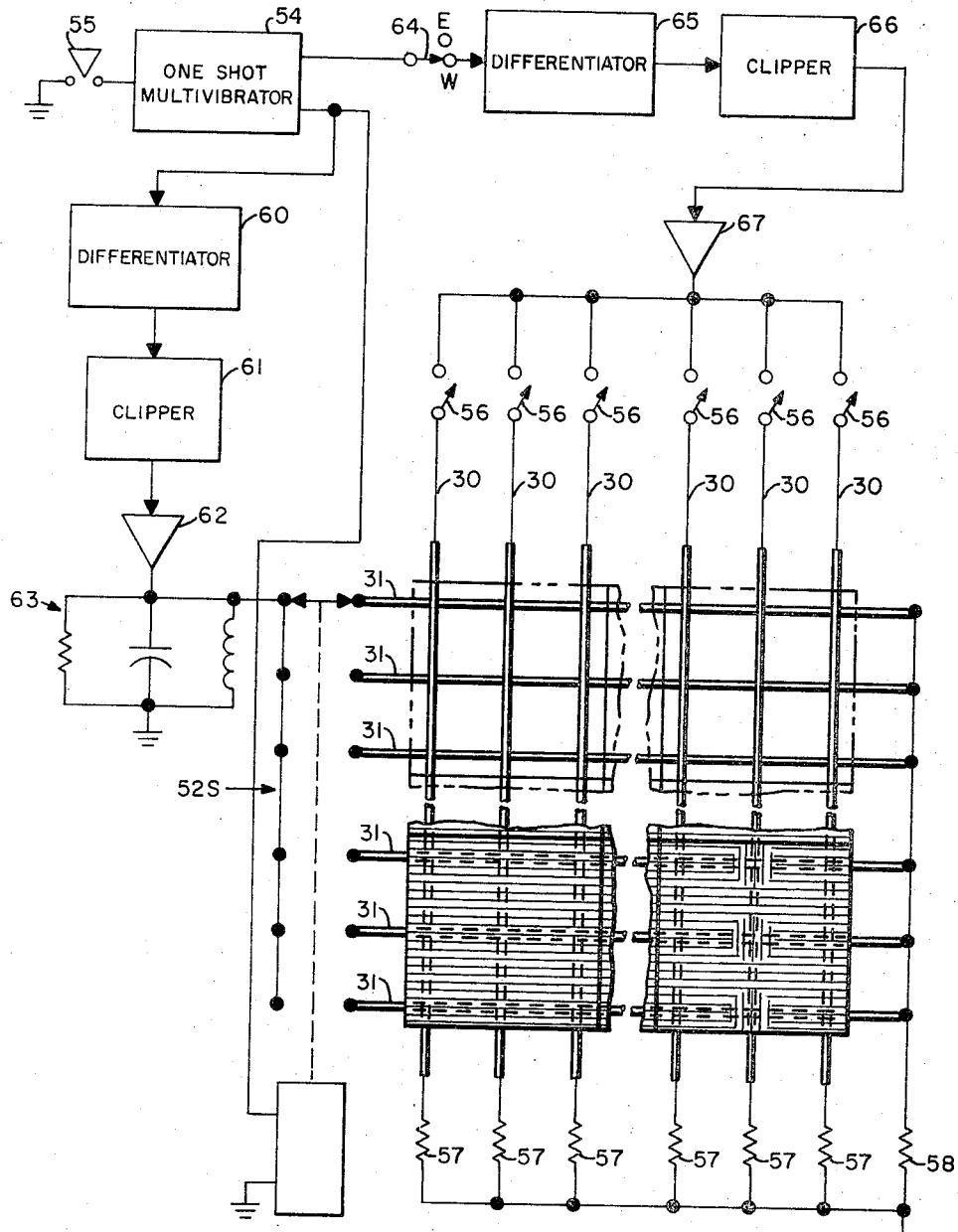

Referring now to FIG. 6, a second way (herein called the "AC-Pulse" mode) of writing and erasing images on a multielement panel of the same type as shown in FIG. 5 may be seen. Thus, complementary outputs are taken from a one shot multivibrator 54 which is controlled by a switch 55. One output is led through a differentiator 60, a clipper 61, an amplifier 62 to a damped oscillating circuit 63 (represented here by a capacitor, an inductance and a resistor in parallel) to a stepping switch 52S. The other output of the one shot multivibrator 54 is led through a switch 64, a differentiator 65, a clipper 66 and an amplifier 67 to a plurality of switches 56.

In operation, the switch 55 causes the one shot multivibrator 54 to produce a pulse, say 10 microseconds wide, which is shaped, clipped and amplified so as to trigger the damped oscillating circuit 63. The output of the last named element is applied, through the stepping switch 52S, to successive ones of the Y current conductors 31. Consequently, the characteristic micro-domain structure of an RIS-1 film is set up in each element 10 parallel to the Y current conductors 31, even though the magnetic film in each element 10 is demagnetized after the decaying current from the damped oscillating circuit dies out. The complementary output from the one shot multivibrator 54 is shaped, clipped and amplified and applied to selected ones of the X current conductors 30 in accordance with the condition of the switches 56. That is, a pulse of DC current is fed through selected ones of the X current conductors 30 coincidentally with and immediately after, the current through a Y current conductor. This DC pulse is of sufficient amplitude to set up a field which switches the direction of magnetization of only demagnetized portions of the magnetic film in each element 10. When it is desired to erase any image, it is necessary only to place the switch 64 on its E position (or to open all the switches 56) and actuate the one shot multivibrator 54 so as to demagnetize the magnetic film in each element 10.

Figure 7:
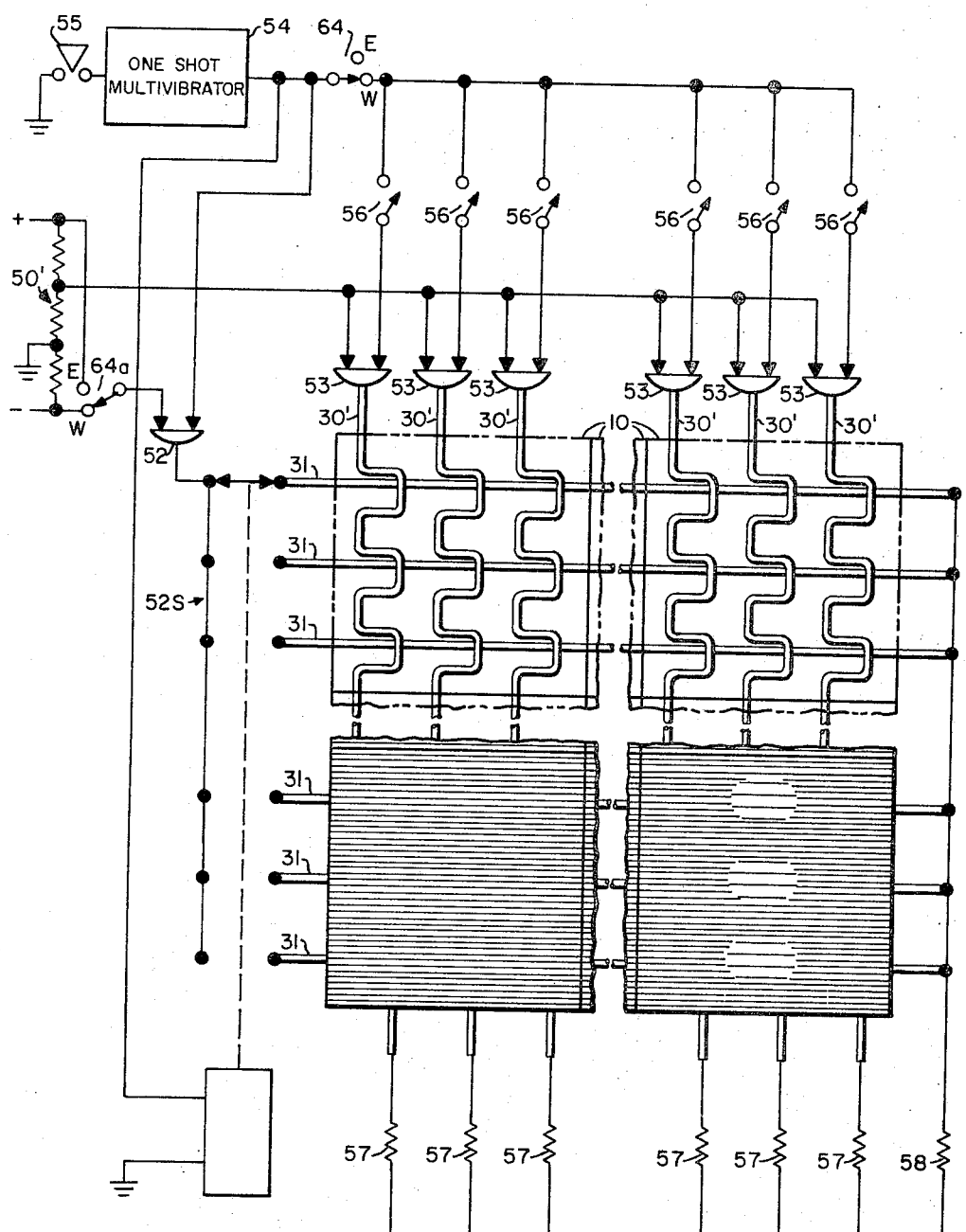

Referring now to FIG. 7, apparatus for forming an image by the so-called "partial demagnetization" mode of operation may be seen. The X current conductors 30' are similar to the X current conductors 30, previously described, except that each one is shaped and positioned as shown so as to run parallel with the Y current conductors 31 for a short distance adjacent each crossover point. Thus, when writing is to be accomplished, a DC source 50' (represented here by a tapped resistor) is connected through a switch 64a and an and gate 52 and a stepping switch 52S to successive ones of the Y conductors 31. At the same time, a voltage which causes an equal, but opposite, magnetic field is fed from the DC source 50', through any of the and gates 53 which are enabled (by closure of selected ones of the switches 56) through selected ones of the X current conductors 30'. The resultant field at the crossover points of the energized one of the Y conductors and the selected ones of the X current conductors 31' depends, when writing, on whether or not the field from the current through the energized Y current conductor is balanced by the field from current through an X current conductor. In the absence of current through an X current conductor, the magnetic film in the element 10 is partially demagnetized by the field from current through the energized Y current conductor, thus widening the domains in the magnetic film and causing the lines of particles of iron oxide marking the walls of such domains to be spaced further apart from one another. To effect erasure of any image on the elements 10 it is necessary only to place the switches 64, 64a in their E position. A saturating field is then applied by way of successive energization of the Y current conductors 31. It may be seen from the foregoing description of the "partial demagnetization" mode of writing and the description (given in connection with FIG. 2) of why diffraction patterns result from illumination of an RIS-1 film having an overlying suspension of iron oxide particles, that the image formed here differs from the image formed by the "coincident pulse" and "AC-Pulse" modes in an important respect. That is, the image formed by the "partial demagnetization" mode of writing is what may be called a "color-on-color" image since an observer at a fixed point sees an image of contrasting color to a bright background instead of a bright image on a dark background.

Working embodiments of this invention have demonstrated that the objects cited hereinbefore have been met. Thus, measurements of the characteristics of display cells according to the invention have been made using a zirconium arc lamp as a source of illumination. The diffracted light intensity of the display cells allow the luminance of the light used in the operation of the display to achieve values in the order of 30 foot lamberts. The intensity of light falling on the magnetic film (between the lines of particles) and directly reflected therefrom is about 25% of the incident light intensity but plays, of course, no part in the operation of the display.

The maximum contrast ratio between image and background was determined by measuring the diffracted light intensities for appropriate orientations of the magnetization in the display element film. A maximum value of 75:1 was found for this ratio when the direction of the light is parallel to the direction of the lines of particles in the "erase" condition. It should be mentioned, however, that the use of different colors of substantially the same intensity in the place of a single color of maximum and minimum intensity appeared equally effective in the formation of patterns.

The range of resolution possible with the described display elements, whether presenting information through the control of the intensity or wavelength of the light displayed, is extremely wide, extending from uniformity across the entire display surface to the control of regions of dimensions less than 5 mils. This is, of course, a result of the extremely stable micro-domain structure within films of the RIS-1 type.

Further, although the maximum speed of response is presently unknown, it has been shown that the described display elements are easily changed at a rate of sixty changes per second. The limiting factor here is thought to be the speed at which the particles of iron oxide may be rotated to follow changes in the micro-domain structure of the magnetic film. Obviously, in view of the small mass of each one of such particles, any required change may be accomplished very quickly.

A moment's thought will make it clear that, even though our invention has been illustrated and described with respect to its use as image forming apparatus restriction to such use is not necessary. Thus, it is clear that the illustrated and described apparatus may be used as a "light valve" when, for example, it is desired to modulate a beam of light in processing digital information. That is, a photocell, or a plurality of photocells could easily be substituted for a viewing screen, thereby providing transducing means to produce an electrical signal representative of the magnetic state of our image forming elements.

There are many other obvious modifications which may be made in the illustrated embodiments of this invention. For example, the embodiments shown in FIGS. 5 and 6 may be easily modified to permit viewing from any point in front of the multielement panel by illuminating the individual elements with monochromatic light and directing the diffracted light on to a diffusing screen. It immediately follows that images of different colors may be so displayed, it merely being necessary to provide different sources of monochromatic light, each source being so positioned that the angle $\phi$ (shown in FIG. 2) is the same, regardless of the wavelength of the light from each such source.

It is also apparent that the writing and erasing means illustrated in the various figures may be modified without departing from our inventive concepts. That is, the manually operated selection switches illustrated hereinbefore are not necessary, it being obvious that their functions may be accomplished in other ways, as by appropriately connected lines to the output of a computer.

It is also evident that the elements themselves may be modified without departing from our inventive concepts. Thus, the width of the individual domains in the micro-domain structure of the magnetic film may, by changes in the method of fabricating such film, be varied within wide limits (so long as the width of each such domain is in the order of a wavelength of the illuminating light) without changing the principles of operation of our invention. Further the material of the magnetic film need not be restricted to a binary alloy such as permalloy, since a ternary alloy, or other ferromagnetic material may be used so long as the selected material has the desired micro-domain structure. In addition, changes in the colloidal suspension (which in revealing the RIS–1 micro-domain structure sets up the interference effects utilized in the display) are possible. That is, the size, shape and reflectivity of the individual particles and the liquid vehicle carrying such particles may be varied as desired. In view of the foregoing it is felt that our invention should not be restricted to its illustrated embodiments, but rather should be limited only by the spirit and scope of the appended claims.

What is claimed is:

1. Apparatus for forming a desired image by diffraction of electromagnetic energy, comprising:
    (a) a ferromagnetic element having a surface exhibiting a domain structure characterized by a plurality of substantially straight and adjacent domains, the width of each one of such domains being in the order of a wavelength of the electromagnetic energy;
    (b) particles of a ferromagnetic material, overlying such surface and clustering in the magnetic field linking successive pairs of domains in the plurality of domains, to form lines of particles contiguous to the surface of the ferromagnetic material, such lines constituting a diffraction grating for the electromagnetic energy;
    (c) means for modifying, in accordance with the desired image, portions of the micro-domain structure in the ferromagnetic element to change, correspondingly, the position of the lines of particles overlying such changed portions; and,
    (d) means for illuminating all the lines of particles with electromagnetic energy to create the desired image in accordance with the diffracted portion of such energy.

2. Apparatus as in claim 1 wherein the ferromagnetic element is a film.

3. Apparatus as in claim 2, wherein the writing means includes:
    (a) a stylus fabricated from a ferromagnetic material; and,
    (b) means for moving the stylus over the ferromagnetic film to change the direction of magnetization of portions of the domain structure thereby to cause the lines of particles of iron oxide overlying such portions to rotate correspondingly.

4. Apparatus as in claim 3, wherein the erasing means includes:
    (a) a bar magnet; and
    (b) means for moving the bar magnet over the ferromagnetic film, thereby to realign the domain structure therein in accordance with the magnetic field of the bar magnet.

5. Apparatus as in claim 4 having, additionally, an optical quarter-wavelength plate and the lighting means includes a source of monochromatic light.

6. Apparatus for forming a visible image by diffraction of light, comprising:
    (a) a ferromagnetic film having a domain structure wherein a plurality of substantially straight and adjacent domains run across one dimension of such film, the width of each one of such domains being in the order of the wavelength of the light;
    (b) a suspension of particles of a ferromagnetic material in a liquid overlying one surface of the ferromagnetic film, such particles clustering in the magnetic field between adjacent domains of such films to form a diffraction grating for diffraction of the light;
    (c) a plurality of wires adjacent to the second surface of the ferromagnetic film;
    (d) means for passing current through selected ones of the wires to switch the direction of magnetization of the domains in portions of the ferromagnetic film determined by the selected ones of the wires, thereby correspondingly to change the pattern of the particles of ferromagnetic material; and,
    (e) lighting means for illuminating the suspension to make a visible image corresponding to the pattern of the particles of ferromagnetic material.

7. A multielement display panel wherein a visible image is formed corresponding to the magnetic state of unit areas of a plurality of similar elements, the visible image consisting of colored portions of any or all of the similar elements on a background of a contrasting color resulting from illumination of such panel with at least bichromatic light, comprising:
    (a) a plurality of similar elements abutting one another, each such element including:
        (1) a ferromagnetic film having a domain structure wherein a plurality of substantially straight and adjacent domains run across one dimension of such film, the width of each one of such domains being in the order of the wavelength of visible light;
        (2) a suspension of particles of iron oxide in a liquid overlying one surface of the ferromagnetic film and clustering in the magnetic field linking successive pairs of domains to form a diffraction grating for diffraction of the light;
    (b) a generally orthogonal matrix of wires overlying the second surface of the ferromagnetic film to form a plurality of crossover points, the wires making up each side of such matrix being parallel to one another adjacent each one of such crossover points;
    (c) means for applying a first pulse of current to each one of the wires making up one side of the substantially orthogonal matrix of wires to produce a magnetic field saturating the portions of the ferromagnetic film adjacent to each one of such wires;
    (d) means for later applying a second pulse of current to successive ones of the wires to which the first pulse of current had been applied, the second pulse being of opposite polarity and of lesser amplitude than the first pulse;
    (e) means for applying, simultaneously with the second pulse of current, a third pulse of current to selected ones of the wires making up the second side of the orthogonal matrix, the polarity of the third pulse of current being opposite to the polarity of the second pulse and the amplitude of the second and the third pulse being substantially equal; and,
    (f) lighting means for illuminating the suspension to create a diffraction pattern, the color of each unit area thereof corresponding with the magnetic state of the magnetic film as determined by the spacing between lines of such particles.

References Cited

UNITED STATES PATENTS

| | | | |
|---|---|---|---|
| 3,059,538 | 10/1962 | Sherwood et al. | 350—151 |
| 3,158,673 | 11/1964 | Sites | 350—151 |
| 3,181,059 | 4/1965 | Mohnkern | 324—28 |

OTHER REFERENCES

Anderson: "Magnetostrictive Readout of Magnetic Film," IBM Technical Disclosure Bulletin, vol. 5, No. 12, May 1963, page 52.

DAVID H. RUBIN, *Primary Examiner.*

J. CORBIN, *Examiner.*